United States Patent
McLain et al.

(10) Patent No.: US 8,095,292 B2
(45) Date of Patent: Jan. 10, 2012

(54) VARIABLE INTAKE MANIFOLD DIAGNOSTIC SYSTEMS AND METHODS

(75) Inventors: Kurt D. McLain, Clarkston, MI (US); Layne K. Wiggins, Plymouth, MI (US); Elizabeth Sarah Peterson, Royal Oak, MI (US)

(73) Assignee: GM Global Technology Operations LLC

( * ) Notice: Subject to any disclaimer, the term of this patent is extended or adjusted under 35 U.S.C. 154(b) by 427 days.

(21) Appl. No.: 12/470,822

(22) Filed: May 22, 2009

(65) Prior Publication Data

US 2010/0294239 A1    Nov. 25, 2010

(51) Int. Cl.
*B60T 7/12* (2006.01)

(52) U.S. Cl. ........ 701/103; 701/114; 123/321; 123/344; 123/345

(58) Field of Classification Search .................. 701/103, 701/114; 123/321, 322, 344–348, 90.15; 73/114.31, 114.32
See application file for complete search history.

(56) References Cited

U.S. PATENT DOCUMENTS

| 4,974,444 | A  | * | 12/1990 | Neubacher | 73/114.32 |
| 5,070,838 | A  | * | 12/1991 | McKay | 123/339.27 |
| 5,520,146 | A  | * | 5/1996 | Hrovat et al. | 123/336 |
| 6,601,387 | B2 | * | 8/2003 | Zurawski et al. | 60/605.2 |
| 7,805,984 | B2 | * | 10/2010 | McLain et al. | 73/114.31 |

* cited by examiner

*Primary Examiner* — John Kwon

(57) ABSTRACT

A system includes a control module, a valve control module, and a diagnostic module. The control module controls a valve of a variable intake manifold when the system operates in a first mode. The control module commands the valve to a first position when a desired airflow through the variable intake manifold is greater than a threshold and commands the valve to a second position when the desired airflow is less than the threshold. The valve control module controls the valve when the system operates in a second mode. The valve control module commands the valve to move from the second position to the first position when the desired airflow is less than the threshold. The diagnostic module determines an operating state of the valve based on whether the valve is detected at the first position a predetermined period after the valve control module commands the valve.

18 Claims, 3 Drawing Sheets

VARIABLE INTAKE MANIFOLD DIAGNOSTIC SYSTEMS AND METHODS

FIELD

The present invention relates to diagnostic systems, and more particularly to systems for diagnosing operation of a valve of a variable length intake manifold.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine may receive intake air from a variable intake manifold (VIM). The VIM may modify a configuration of an intake tract that guides the intake air into the engine. For example, the VIM may modify a length of the intake tract, a diameter of the intake tract, a volume of the intake tract, and a number of runners that guide air into cylinders of the engine.

The VIM may include two intake tract lengths when the VIM is capable of modifying the length of the intake tract. The two intake tract lengths may accommodate different amounts of airflow into the engine. For example, a shorter intake tract may accommodate a greater amount of airflow than a longer intake tract. The VIM may include a valve that selects the length of the intake tract. An engine control module may actuate the valve to select the length of the intake tract based on engine operating conditions.

SUMMARY

A system comprises a control module, a valve control module, and a diagnostic module. The control module controls a valve of a variable intake manifold when the system operates in a first mode. The control module commands the valve to a first position when a desired airflow through the variable intake manifold is greater than a threshold and commands the valve to a second position when the desired airflow is less than the threshold. The valve control module controls the valve when the system operates in a second mode. The valve control module commands the valve to move from the second position to the first position when the desired airflow is less than the threshold. The diagnostic module determines an operating state of the valve based on whether the valve is detected at the first position a predetermined period after the valve control module commands the valve.

A method comprises commanding a valve of a variable intake manifold to a first position when a desired airflow through the variable intake manifold is greater than a threshold when operating in a first mode. The method further comprises commanding the valve to a second position when the desired airflow is less than the threshold when operating in the first mode. The method further comprises commanding the valve to move from the second position to the first position when the desired airflow is less than the threshold when operating in a second mode. Additionally, the method comprises determining an operating state of the valve based on whether the valve is detected at the first position a predetermined period after commanding the valve to move from the second position to the first position in the second mode.

BRIEF DESCRIPTION OF THE DRAWINGS

The drawings described herein are for illustration purposes only and are not intended to limit the scope of the present disclosure in any way.

DETAILED DESCRIPTION

Figure 1:
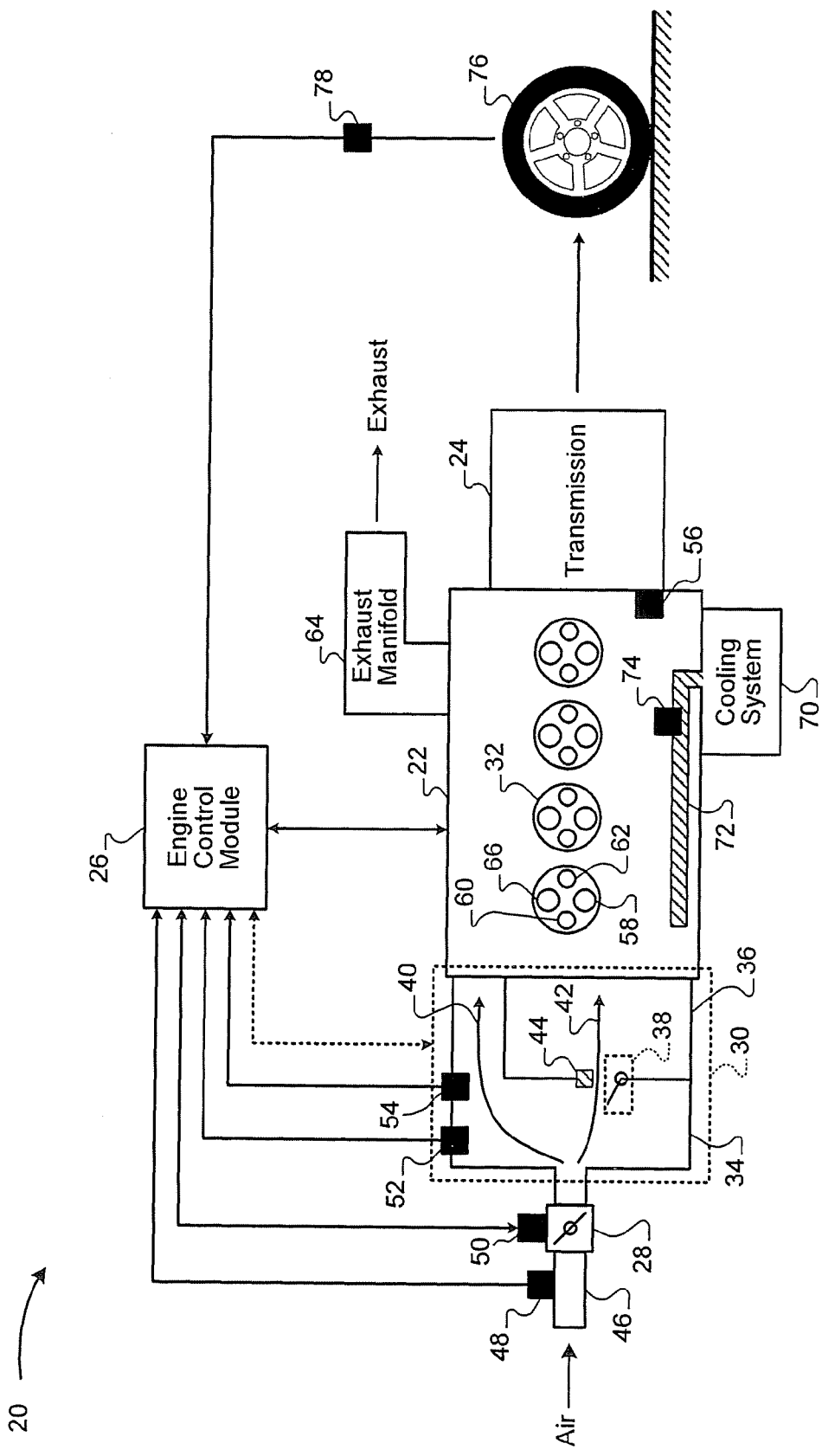
FIG. 1 is a functional block diagram of a vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

A variable length intake manifold (VLIM) may include two configurations of intake tracts that guide air into an engine. An engine control module may actuate a valve of the VLIM to select between the two configurations of intake tracts based on a desired airflow used to operate the engine. The desired airflow may be an amount of air that flows through the VLIM and into cylinders of the engine to operate the engine. For example, the desired airflow may be based on throttle position, engine speed, and vehicle speed.

A VLIM diagnostic system according to the present disclosure determines whether the valve is functioning properly. The VLIM diagnostic system actuates the valve to a predetermined position when enabling criteria are met. The enabling criteria may include operating conditions of the engine (e.g., engine speed) that indicate when the valve may be actuated without affecting operation of the engine. The VLIM diagnostic system generates a fault when the valve is not detected at the predetermined position during a diagnostic period.

Referring now to FIG. 1, an exemplary vehicle system 20 includes a combustion engine 22 that drives a transmission 24. While a spark ignition engine is illustrated, other engines are contemplated. For example only, compression ignition engines and homogenous charge compression ignition (HCCI) engines are also contemplated. An engine control module (ECM) 26 communicates with components of the vehicle system 20. Components of the vehicle system 20 include the engine 22, sensors, and actuators. The ECM 26 may implement the VLIM diagnostic system of the present disclosure.

A throttle 28 may regulate airflow into a VLIM 30. Air within the VLIM 30 is distributed into cylinders 32. The VLIM 30 may include runners (not shown) that direct air into the cylinders 32. Each cylinder 32 may communicate with one or more runners. Although FIG. 1 depicts four cylinders 32, the engine 22 may include additional or fewer cylinders.

The VLIM 30 may include a first intake tract 34 and a second intake tract 36 that each direct air into the cylinders 32. The first and second intake tracts 34, 36 may include different tract lengths and tract geometries. Accordingly, the first and second intake tracts 34, 36 may accommodate different amounts of airflow. Hereinafter, the first intake tract 34 may accommodate a greater amount of airflow than the second intake tract 36. Accordingly, in one implementation, the first intake tract 34 may be shorter than the second intake tract 36.

The VLIM 30 may include a valve 38 (hereinafter "VLIM valve 38") that controls airflow through the first and/or second intake tracts 34, 36. Air may be directed through the first intake tract 34 to the cylinders 32 when the VLIM valve 38 is in a first position. Air may be restricted from flowing through the second intake tract 36 when the VLIM valve 38 is in the first position. Air directed through the first intake tract 34 is illustrated at 40. Air may be directed through the second intake tract 36 when the VLIM valve 38 is in a second position. Air may be restricted from flowing through the first intake tract 34 when the VLIM valve 38 is in the second position. Air directed through the second intake tract 36 is illustrated at 42.

The ECM 26 may command the VLIM valve 38 to adjust a position of the VLIM valve 38. For example, the ECM 26 may provide a voltage and/or current to adjust the VLIM valve 38 when the VLIM valve 38 includes an electrically operated valve. The ECM 26 may command the VLIM valve 38 to position the VLIM valve 38 to one of the first and second positions.

The ECM 26 may command the VLIM valve 38 to one of the first and second positions based on the desired airflow of the engine 22. Generally, the ECM 26 commands the VLIM valve 38 to the second position when the desired airflow is less than a predetermined airflow. For example, the desired airflow may be less than the predetermined airflow when the throttle 28 is closed and when the engine speed is less than a predetermined engine speed.

Generally, the ECM 26 commands the valve to move from the second position to the first position when the desired airflow increases above the predetermined airflow. For example, the desired airflow may increase to greater than the predetermined airflow when the engine speed increases to greater than the predetermined engine speed and the throttle opens to allow more airflow into the cylinders 32.

A VLIM sensor 44 senses the position of the VLIM valve 38 and generates a VLIM signal that indicates the position of the VLIM valve 38. The ECM 26 may determine the position of the VLIM valve 38 based on the VLIM signal. For example, the ECM 26 may determine whether the VLIM valve 38 is in the first position or the second position based on the VLIM signal. Additionally, the ECM 26 may determine the position of the VLIM valve 38 when the VLIM valve 38 is between the first and second positions based on the VLIM signal. The VLIM sensor 44 may include an analog or digital sensor.

The first and second intake tracts 34, 36 of the VLIM 30 may represent various configurations of variable intake manifolds. For example, the VLIM 30 may be implemented by changing a length of the intake tract, changing a diameter of the intake tract, changing a volume of the intake tract, and changing a number of runners that guide air into the cylinders 32.

Air is passed from an inlet 46 through a mass airflow (MAF) sensor 48, such as a mass airflow meter. The MAF sensor 48 generates a MAF signal that indicates a mass flow rate of air flowing through the MAF sensor 48. Inlet air may be metered to the engine 22 via the throttle 28. For example only, the throttle 28 may include a butterfly valve that rotates within the inlet 46. The throttle 28 is actuated based on an engine operating point commanded by an operator and/or a controller. A throttle position sensor (TPS) 50 generates a TPS signal that indicates a position of the throttle 28. The ECM 26 may actuate the VLIM valve 38 based on the position of the throttle 28 to control airflow into the cylinders 32. For example, the ECM 26 may command the VLIM valve 38 to the first position when the throttle 28 is in an open position (e.g., wide open) to allow for greater airflow into the cylinders 32.

A manifold pressure (MAP) sensor 52 may be positioned in the VLIM 30 between the throttle 28 and the engine 22. The MAP sensor 52 generates a MAP signal that indicates manifold absolute air pressure. An intake air temperature (IAT) sensor 54 located in the VLIM 30 generates an IAT signal that indicates a temperature of intake air.

An engine crankshaft (not shown) rotates at engine speed or a rate that is proportional to the engine speed. A crankshaft sensor 56 generates a crankshaft position (CSP) signal that indicates rotation of the crankshaft. The ECM 26 may determine the engine speed and cylinder events based on the CSP signal. The engine speed and cylinder events may be sensed using other suitable methods.

An intake valve 58 selectively opens and closes to enable air to enter the cylinder 32. An intake camshaft (not shown) regulates a position of the intake valve 58. The ECM 26 actuates a fuel injector 60 to inject fuel into the cylinder 32. A piston (not shown) compresses the air/fuel mixture within the cylinder 32. The ECM 26 may actuate a spark plug 62 to initiate combustion of the air/fuel mixture. Alternatively, the air/fuel mixture may be ignited by compression in a compression ignition engine. Combustion exhaust within the cylinder 32 is forced out through an exhaust manifold 64 when the exhaust valve 66 is in an open position. An exhaust camshaft (not shown) regulates a position of the exhaust valve 66.

The engine 22 may include a cooling system 70 that circulates an engine coolant. The cooling system 70 may include a pump (not shown) that pumps the engine coolant through passages 72 in the engine 22. The pump may be powered by the crankshaft. An engine coolant temperature (ECT) sensor 74 may be located within the engine 22 or at other locations where the engine coolant is circulated, such as a radiator (not shown). The ECT sensor 74 generates an ECT signal that indicates engine coolant temperature. The ECM 26 may determine a temperature of the engine 22 based on the ECT signal.

Drive torque produced by the engine 22 may drive wheels 76 of the vehicle system 20. The vehicle system 20 may include one or more vehicle speed sensors (VSS) 78 that generate vehicle speed signals that indicate a speed of the vehicle system 20. The ECM 26 may determine a speed of the vehicle system 20 based on the vehicle speed signals. For example only, the VSS 78 may include wheel speed sensors that indicate rotational speed of the wheels 76 and/or a sensor that indicates rotational speed of an output shaft of the transmission 24.

Figure 2:
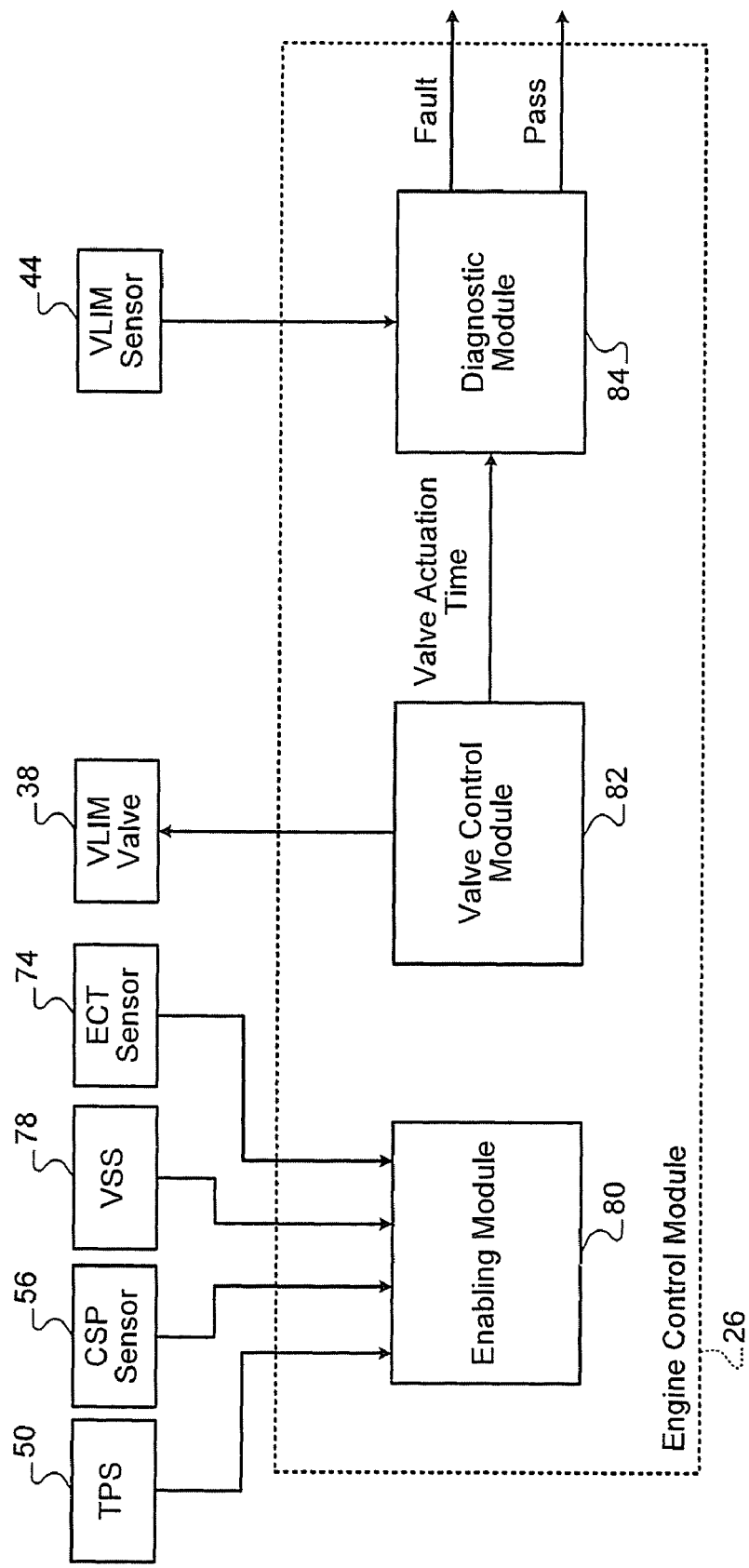
FIG. 2 is a functional block diagram of an engine control module according to the present disclosure.

Referring now to FIG. 2, the ECM 26 includes an enabling module 80, a valve control module 82, and a diagnostic module 84. The ECM 26 receives input signals from the vehicle system 20. The input signals may include one or more of the VLIM, MAF, TPS, MAP, IAT, CSP, ECT, and/or vehicle speed signals. The input signals are hereinafter referred to as "vehicle system signals." The ECM 26 processes the vehicle system signals and generates timed engine control commands that are output to the vehicle system 20. For example, engine control commands may actuate the throttle 28, the fuel injectors 60, the spark plugs 62, and the VLIM valve 38.

The enabling module 80 determines whether the enabling criteria are met. The valve control module 82 commands the VLIM valve 38 to position the VLIM valve 38 to the predetermined position when the enabling criteria are met. The diagnostic module 84 determines the position of the VLIM valve 38 and determines whether the VLIM valve 38 is functioning properly based on the position of the VLIM valve 38 during the diagnostic period.

Generally, the ECM 26 commands the VLIM valve 38 based on the desired airflow. The ECM 26 may command the VLIM valve 38 to move from the second position to the first position when the desired airflow is greater than the predetermined airflow to allow more airflow into the cylinders 32. For example, the desired airflow may be greater than the predetermined airflow when engine speed is greater than the predetermined engine speed and the throttle 28 is in the open position (e.g., wide open). Airflow may be restricted to the cylinders 32 when the VLIM valve 38 is at the second position, the engine speed is greater than the predetermined engine speed, and the throttle 28 is in the open position. Accordingly, operation of the engine 22 may be affected depending on the position of the VLIM valve 38 when the desired airflow is greater than the predetermined airflow.

Airflow may not be restricted to the cylinders 32 when the VLIM valve 38 is at the second position and the desired airflow is less than the predetermined airflow. Therefore, movement of the VLIM valve 38 may not affect operation of the engine 22 when the desired airflow is less than the predetermined airflow. Accordingly, the VLIM diagnostic system may actuate the VLIM valve 38 and diagnose whether the VLIM valve 38 is functioning properly when the desired airflow is less than the predetermined airflow without affecting operation of the engine 22. For example, the VLIM diagnostic system may actuate the VLIM valve 38 from the first position to the second position when the engine speed is less than the predetermined engine speed without affecting operation of the engine 22. The VLIM diagnostic system may also actuate the VLIM valve 38 from the second position to the first position when the engine speed is less than the predetermined engine speed without affecting operation of the engine 22. The VLIM diagnostic system may actuate the VLIM valve 38 to cycle between the first and second positions a predetermined number of times while the engine speed is less than the predetermined engine speed.

The enabling module 80 determines whether the enabling criteria have been met based on the vehicle system signals. The enabling criteria may include parameters of the vehicle system 20 that indicate when the VLIM valve 38 may be adjusted without affecting operation of the engine 22. Accordingly, the enabling criteria may include parameters of the vehicle system 20 that indicate the desired airflow of the engine 22.

One of the enabling criteria may be an engine speed criterion. The enabling module 80 determines that the engine speed criterion is met when the engine speed is less than the predetermined engine speed. The enabling module 80 may determine the engine speed based on the CSP signal.

The enabling criteria may include a throttle position criterion. The enabling module 80 may determine that the throttle position criterion is met when the throttle position is less than a predetermined throttle position. For example, the throttle position may be less that the predetermined throttle position when the throttle 28 is closed. The throttle position may be greater than the predetermined position when the throttle 28 is wide open. The enabling module 80 may determine the throttle position based on the TPS signal.

The enabling criteria may include a vehicle speed criterion. The enabling module 80 determines that the vehicle speed criterion is met when the speed of the vehicle system 20 is less than a predetermined vehicle speed. The enabling module 80 may determine the speed of the vehicle system 20 based on the vehicle speed signals.

Further enabling criteria may include parameters of the engine 22 that indicate a period during which the engine 22 has been operating. The VLIM diagnostic system may diagnose the VLIM valve 38 based on the period during which the engine 22 has been operating to account for temperature effects on airflow. For example, the enabling criteria may include a temperature criterion based on the temperature of the engine 22 and an operating time criterion based on an operating time of the engine 22. The enabling module 80 may determine that the temperature criterion is met when the temperature of the engine 22 is greater than a predetermined engine temperature. The enabling module 80 may determine the temperature of the engine 22 based on the ECT signal.

The enabling module 80 may determine that the operating time criterion is met when the operating time of the engine 22 is greater than a predetermined operating time. The enabling module 80 may determine the operating time of the engine 22 based on a timer that indicates an amount of time the engine 22 has operated since the engine 22 was started. Alternatively, the enabling module 80 may determine the operating time of the engine 22 based on the ECT signal. For example, the enabling module 80 may determine that the engine 22 was operating for a period of time when the temperature of the engine coolant is greater than a predetermined coolant temperature.

In some implementations, the enabling module 80 may determine the enabling criteria are met when at least one of the engine speed criterion, the vehicle speed criterion, and the throttle position criterion are met regardless of whether the engine temperature criterion and the operating time criterion are met. For example, the enabling module 80 may determine the enabling criteria are met when the engine speed is less than the predetermined engine speed, the operating time is less than the predetermined operating time, and the temperature of the engine 22 is less than the predetermined engine temperature.

In other implementations, the enabling module 80 may determine the enabling criteria are met when at least one of the engine speed criterion, the vehicle speed criterion, and the throttle position criterion are met and at least one of the temperature criterion and operating time criterion are met. For example, the enabling module 80 may determine the enabling criteria are met when the vehicle speed is less than the predetermined vehicle speed and the temperature of the engine 22 is greater than the predetermined engine temperature.

The valve control module 82 commands the VLIM valve 38 when the enabling criteria are met. The valve control module 82 may apply the voltage and/or current to the VLIM valve 38 when the valve control module 82 commands the VLIM valve 38. The valve control module 82 may command the VLIM valve 38 to position the VLIM valve 38 at the first or second positions. For example, when the VLIM valve 38 is in the first position, the valve control module 82 may command the VLIM valve 38 to position the VLIM valve 38 at the second position. Alternatively, when the VLIM valve 38 is in the second position, the valve control module 82 may command the VLIM valve 38 to position the VLIM valve 38 at the first position. The valve control module 82 generates a time (hereinafter "valve actuation time") that corresponds to when the valve control module 82 actuates the VLIM valve 38 to move from the first/second position to the second/first position. The valve control module 82 outputs the valve actuation time to the diagnostic module 84.

The diagnostic module 84 receives the valve actuation time and generates the diagnostic period. The diagnostic module 84 determines whether the VLIM valve 38 is functioning properly during the diagnostic period. The diagnostic module 84 generates the diagnostic period based on the valve actuation time and a predetermined delay period. The diagnostic period begins at the valve actuation time and ends after the predetermined delay period. The predetermined delay period may be based on an amount of time it takes for a functional VLIM valve to move from the first/second position to the second/first position. For example, the functional VLIM valve may move from the first/second position to the second/first position within 3 seconds. Accordingly, the diagnostic period may include a 3 second period that begins at the valve actuation time.

The diagnostic module 84 determines the position of the VLIM valve 38 based on the VLIM signal received from the VLIM sensor 44. The diagnostic module 84 may determine whether the VLIM valve 38 is at the first or second position based on the VLIM signal. Accordingly, the diagnostic module 84 may determine when the VLIM valve 38 moves from the first/second position to the second/first position.

The diagnostic module 84 determines the VLIM valve 38 is functioning properly when the VLIM valve 38 has moved from the first/second position to the second/first position during the diagnostic period. The diagnostic module 84 may set a pass code when the diagnostic module 84 determines that the VLIM valve 38 is functioning properly. The pass code may notify a vehicle operator and/or a service technician that the VLIM valve 38 is functioning properly.

The diagnostic module 84 determines the VLIM valve 38 is not functioning properly when the VLIM valve 38 has not moved from the first/second position to the second/first position during the diagnostic period. The diagnostic module 84 indicates a fault when the valve is not functioning properly. The diagnostic module 84 may set a fault code to indicate the fault when the diagnostic module 84 determines that the VLIM valve 38 is not functioning properly. The fault code may include setting a diagnostic trouble code (DTC) and/or a malfunction indicator light (MIL). The DTC and/or MIL may notify the vehicle operator and/or the service technician that the VLIM valve 38 did not function properly during the diagnostic.

Figure 3:
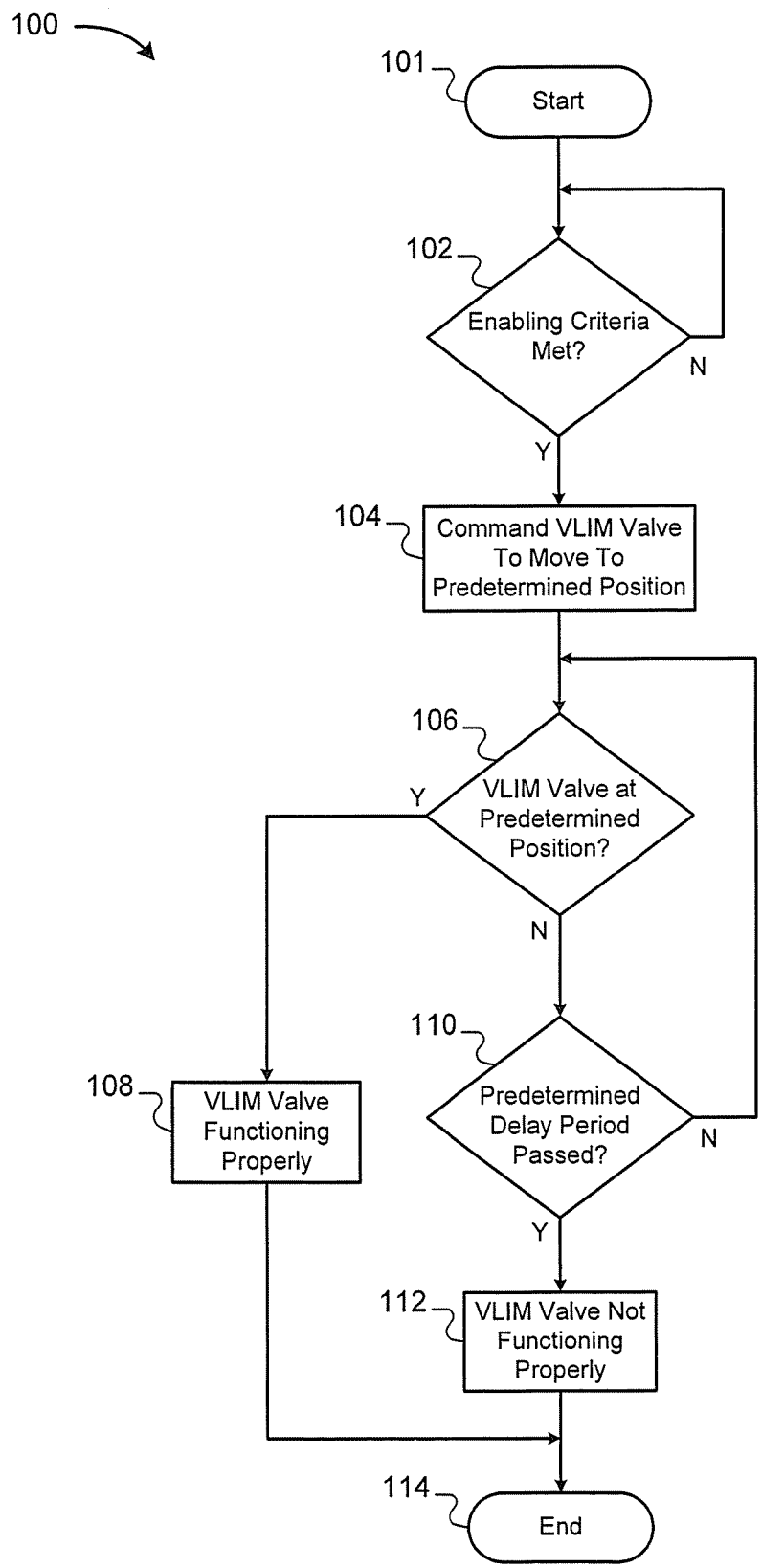
FIG. 3 is a flow diagram that illustrates the steps of a method for diagnosing operation of a valve of a variable length intake manifold according to the present disclosure.

Referring now to FIG. 3, an exemplary method 100 for diagnosing operation of a valve of a variable length intake manifold begins in step 101. In step 102, the enabling module 80 determines whether the enabling criteria have been met. If the result of step 102 is false, the method 100 repeats step 102. If the result of step 102 is true, the method 100 continues with step 104. In step 104, the valve control module 82 commands the VLIM valve 38 to position the VLIM valve 38 at the predetermined position. In step 106, the diagnostic module 84 determines whether the VLIM valve 38 has moved to the predetermined position. If the result of step 106 is true, the method 100 continues with step 108. If the result of step 106 is false, the method 100 continues with step 110. In step 108, the diagnostic module 84 determines that the VLIM valve 38 is functioning properly. In step 110, the diagnostic module 84 determines whether the predetermined delay period has passed since the valve control module 82 commanded the VLIM valve 38 to the predetermined position. If the result of step 110 is false, the method 100 repeats step 106. If the result of step 110 is true, the method 100 continues with step 112. In step 112, the diagnostic module 84 determines that the VLIM valve 38 is not functioning properly. The method 100 ends in step 114.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A system comprising:
   a control module that controls a valve of a variable intake manifold when the system operates in a first mode, that commands the valve to a first position when a desired airflow through the variable intake manifold is greater than a threshold, and that commands the valve to a second position when the desired airflow is less than the threshold;
   a valve control module that controls the valve of the variable intake manifold when the system operates in a second mode and that commands the valve to move from the second position to the first position when the desired airflow is less than the threshold; and
   a diagnostic module that determines an operating state of the valve based on whether the valve is detected at the first position a predetermined period after the valve control module commands the valve.

2. The system of claim 1 wherein the control module and the valve control module command the valve to modify a configuration of an intake tract of the variable intake manifold, wherein the intake tract guides air into cylinders of an engine.

3. The system of claim 2 wherein the control module and the valve control module command the valve to modify at least one of a length of the intake tract, a diameter of the intake tract, a volume of the intake tract, and a number of runners that guide air into the cylinders.

4. The system of claim 1 wherein the control module commands the valve to the first position to increase an amount of air guided into cylinders of an engine and commands the valve to the second position to reduce the amount of air guided into the cylinders of the engine.

5. The system of claim 1 wherein the desired airflow is determined based on at least one of a speed of an engine, a position of a throttle, and a speed of a vehicle.

6. The system of claim 5 wherein the valve control module commands the valve to move from the second position to the first position when at least one of the speed of the engine is less than a predetermined speed and the speed of the vehicle is less than a predetermined vehicle speed.

7. The system of claim 1 wherein the valve control module commands the valve to move from the second position to the first position when at least one of a temperature of an engine is greater than a predetermined temperature and an operating period of the engine is greater than a predetermined operating period.

8. The system of claim 1 wherein the diagnostic module determines that the operating state of the valve is a fault state when the valve is not detected at the first position.

9. The system of claim 8 wherein the diagnostic module sets at least one of a malfunction indicator light and a diagnostic trouble code when the operating state of the valve is the fault state.

10. A method comprising:

commanding a valve of a variable intake manifold to a first position when a desired airflow through the variable intake manifold is greater than a threshold when operating in a first mode;

commanding the valve to a second position when the desired airflow is less than the threshold when operating in the first mode;

commanding the valve to move from the second position to the first position when the desired airflow is less than the threshold when operating in a second mode; and determining an operating state of the valve based on whether the valve is detected at the first position a predetermined period after commanding the valve to move from the second position to the first position in the second mode.

11. The method of claim 10 further comprising commanding the valve to modify a configuration of an intake tract of the variable intake manifold, wherein the intake tract guides air into cylinders of an engine.

12. The method of claim 11 further comprising commanding the valve to modify at least one of a length of the intake tract, a diameter of the intake tract, a volume of the intake tract, and a number of runners that guide air into the cylinders.

13. The method of claim 10 further comprising:
commanding the valve to the first position to increase an amount of air guided into cylinders of an engine; and
commanding the valve to the second position to reduce the amount of air guided into the cylinders of the engine.

14. The method of claim 10 further comprising determining the desired airflow based on at least one of a speed of an engine, a position of a throttle, and a speed of a vehicle.

15. The method of claim 14 further comprising commanding the valve to move from the second position to the first position in the second mode when at least one of the speed of the engine is less than a predetermined speed and the speed of the vehicle is less than a predetermined vehicle speed.

16. The method of claim 10 further comprising commanding the valve to move from the second position to the first position in the second mode when at least one of a temperature of an engine is greater than a predetermined temperature and an operating period of the engine is greater than a predetermined operating period.

17. The method of claim 10 further comprising determining that the operating state of the valve is a fault state when the valve is not detected at the first position.

18. The method of claim 17 further comprising setting at least one of a malfunction indicator light and a diagnostic trouble code when the operating state of the valve is the fault state.

* * * * *